(No Model.)
A. FISCUS.
STOCK RAKE.
No. 512,176. Patented Jan. 2, 1894.
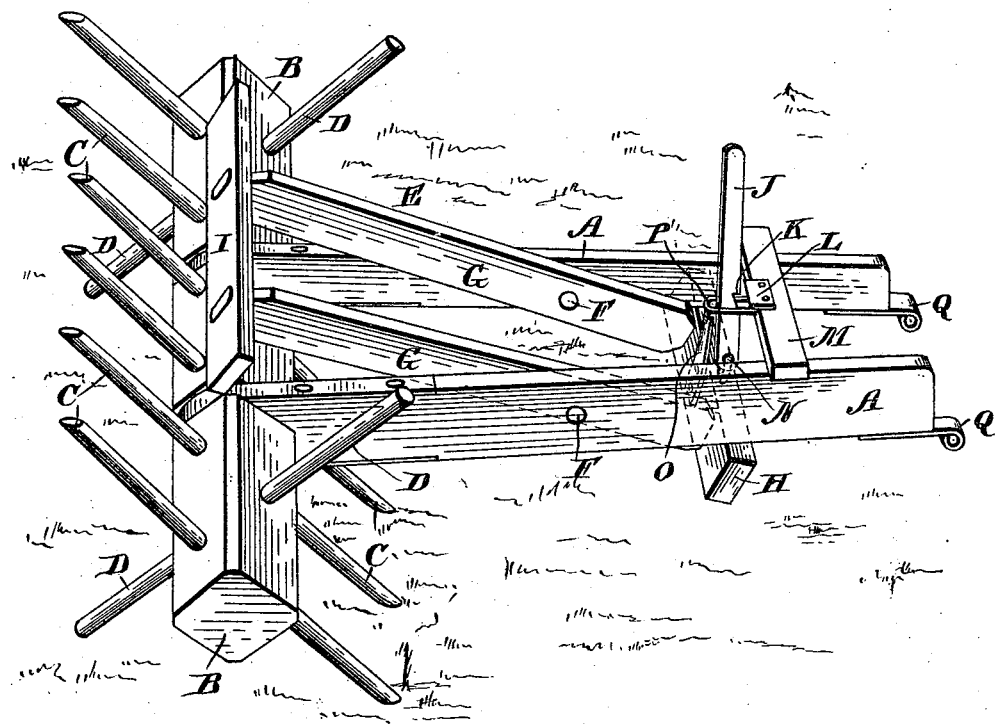
Witnesses
Goverance
Geo W Harvey
Inventor
Adam Fiscus
by Fenelon B. Brock
Attorney

UNITED STATES PATENT OFFICE.

ADAM FISCUS, OF FISCUS, IOWA.

STOCK-RAKE.

SPECIFICATION forming part of Letters Patent No. 512,176, dated January 2, 1894.

Application filed March 17, 1893. Serial No. 466,487. (No model.)

*To all whom it may concern:*

Be it known that I, ADAM FISCUS, a citizen of the United States, residing at Fiscus, in the county of Audubon, State of Iowa, have invented certain new and useful Improvements in Stock-Rakes; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.

My present invention relates to rakes.

The object of my invention, more particularly stated, is to provide a stock-rake which is very simple and effective in its operation, not liable to become broken or to get out of repair, and cheap to manufacture.

With these purposes and objects in view my invention consists in the following construction and combination of parts, which will first be fully set forth and described, and the features of novelty then pointed out and claimed.

The drawing represents a perspective view of a stock-rake embodying my invention, and to which I have applied my improvements.

A represents the two main stringers of the rake-frame, to the rear of which, by suitable journal bearings, the rake-shaft or bar B is rotatably mounted transversely to the line of draft.

C are the rake-teeth, which are preferably rigid, or practically so, and extend diametrically through the rake-shaft B, holes being provided therethrough for that purpose. D are two teeth also inserted diametrically through the rake-shaft, but at right angles to the rake-teeth. These bars D, in connection with the teeth C serve to support the rake with the teeth C in the position shown in the drawing, whether one set or the opposite one of the teeth be in position for raking.

E is a locking-bar frame pivoted at F to the stringers A. It consists of parallel side bars G, a front cross-bar, H, and a rear cross bar I. The latter bar I is arranged to be thrown into engagement with the upper set of teeth C so as to lock the rake-shaft B and its teeth in position for raking in either one of the raking positions of the teeth. When raking the locking-bar frame is held in position by the pivoted lever J, which is provided with a notch or engagement K, which takes over a plate L on the cross bar M and securely holds the locking-frame and rake teeth.

N is the pivotal point of lever J, and O is the spring which bears against the lever and normally throws it into engagement with the plate L until it is released by hand.

To dump the rake the lever J is pulled rearwardly, when the draft of the team causes the rake-shaft to revolve, the bar I of the locking frame riding up over the teeth C and falling again into position so that it opposes and locks the succeeding set of teeth as they revolve and come into contact with the bar I. The succeeding dumping movements of the rake are effected in the same manner.

P is a guide way or staple which limits and guides the movements of the lever J. The draft attachments for the rake are secured to the hinges or clevises on the front end of the stringers.

I claim—

In a flop-over rake, the combination of a rake-head, teeth secured therein and projecting from the opposite sides thereof, supporting-bars similarly projecting disposed at right angles to the rake-teeth, a frame in the rear of which the rake-head is rotatably mounted, a stop-frame pivoted in the rake-frame, having a bar at one end for engaging the rake-teeth and a spring-lever connection at the other end engaging the frame, whereby when the spring connection is released the draft of the rake causes the stop-bar to ride up over one series of rake-teeth and drop down into locking position against the opposite series.

In testimony whereof I affix my signature in presence of two witnesses.

ADAM FISCUS.

Witnesses:
EUGENE W. FISCUS,
FRANK FISCUS.